United States Patent
Wern

(10) Patent No.: US 11,458,580 B2
(45) Date of Patent: *Oct. 4, 2022

(54) OVERSIZED PART HOLD DOWN APPARATUS

(71) Applicant: ENGINEERED ABRASIVES, INC., Alsip, IL (US)

(72) Inventor: Michael J. Wern, Alsip, IL (US)

(73) Assignee: Engineered Abrasives, Inc., Alsip, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/971,878

(22) PCT Filed: Feb. 22, 2019

(86) PCT No.: PCT/US2019/019240
§ 371 (c)(1),
(2) Date: Aug. 21, 2020

(87) PCT Pub. No.: WO2019/165270
PCT Pub. Date: Aug. 29, 2019

(65) Prior Publication Data
US 2021/0107105 A1 Apr. 15, 2021

Related U.S. Application Data

(60) Provisional application No. 62/634,356, filed on Feb. 23, 2018.

(51) Int. Cl.
*B25B 5/06* (2006.01)
*B23Q 3/06* (2006.01)
(Continued)

(52) U.S. Cl.
CPC ............ *B23Q 3/069* (2013.01); *B23F 17/006* (2013.01); *B23F 23/02* (2013.01); *B23Q 39/042* (2013.01);
(Continued)

(58) Field of Classification Search
CPC .......... B23Q 3/002; B23Q 3/20; B23Q 3/069; B23Q 39/042; B23F 17/006; B23F 23/06;
(Continued)

(56) References Cited

U.S. PATENT DOCUMENTS

| 2,477,197 | A | * | 7/1949 | Montuori | ............... | A61C 13/18 |
| | | | | | | 269/254 R |
| 5,272,897 | A | * | 12/1993 | Wern | .................. | B23Q 39/042 |
| | | | | | | 269/254 CS |
| 2016/0214223 | A1 | * | 7/2016 | Wern | ........................ | B24C 3/32 |

* cited by examiner

*Primary Examiner* — Monica S Carter
*Assistant Examiner* — Alberto Saenz
(74) *Attorney, Agent, or Firm* — BakerHostetler

(57) ABSTRACT

The present disclosure includes a part hold-down assembly for retaining an oversized part. The part hold-down assembly is aligned along a central force axis and applies a downward force onto the part. The part-hold down assembly includes a top plate, a bottom plate, and a compression assembly extending between the top and bottom plates. The compression assembly includes two, parallel biasing assemblies that extend along compression axes that are parallel to but offset from the central force axis. Each biasing assembly including an upper collar, a lower collar and a resilient biasing member, in one embodiment in the form of a coil spring, retained between the upper and lower collar. The parallel biasing assemblies are positioned on opposite sides from each other about the central force axis, and may be spaced away from the central force axis an equal distance.

20 Claims, 6 Drawing Sheets

(51) Int. Cl.
*B23Q 39/04* (2006.01)
*B23F 17/00* (2006.01)
*B23F 23/02* (2006.01)
*B24C 3/20* (2006.01)
B24C 3/22 (2006.01)
B24C 1/10 (2006.01)
B23F 23/12 (2006.01)
B23F 23/06 (2006.01)

(52) U.S. Cl.
CPC ............... *B24C 3/20* (2013.01); *B25B 5/06* (2013.01); *B23F 23/06* (2013.01); *B23F 23/1293* (2013.01); *B24C 1/10* (2013.01); *B24C 3/22* (2013.01)

(58) Field of Classification Search
CPC ......... B23F 23/1293; B25B 5/06; B23C 3/22; B24C 1/10
USPC .............................. 269/254 cs, 254 r; 29/559
See application file for complete search history.

OVERSIZED PART HOLD DOWN APPARATUS

CROSS-REFERENCE TO RELATED APPLICATIONS

This application is the National Stage Application of International Patent Application No. PCTUS2019/019240 filed Feb. 22, 2019, which claims priority to and the benefit of provisional patent application 62/634,356 filed Feb. 23, 2018, which is incorporated herein by reference in its entirety.

BACKGROUND

The subject matter disclosed herein relates to a part hold-down assembly, and more particularly, a part hold-down assembly for a part processing apparatus. More particularly, the present invention includes a system, method, and apparatus for use in holding and fixturing oversized parts in an automatic apparatus for processing parts. The hold-down device is similar to the device shown in U.S. Pat. No. 5,272,897, which is hereby incorporated by reference.

A hold-down apparatus may be used in an automatic part processing apparatus for automatically processing a part or work piece by methods such as shot peening and the like. Hold-down devices as shown in U.S. Pat. No. 5,272,897 include a single compression or resilient biasing member secured to corresponding collars by welds to releasably hold parts or work pieces in the apparatus during processing. In particular, the hold-down devices are configured to apply a force upon the part being processed to ensure the part is held at the desired location, and rotates at a consistent and desired speed, for automatic processing to occur.

Components of the hold-down devices, such as the resilient biasing member, are configured to apply sufficient force for a range of standard part sizes, shapes and weights. However, in light of the size and weight constraints of, for example, the resilient biasing member used, the hold-down devices may be unable to provide sufficient application force to an oversized part, such as a larger-than-normal sized or heavier-than-typical-weight part, that requires such processing. The present invention is an improvement on the hold down device to address this potential issue and permit automated processing of oversized parts.

This background information is provided to provide some information believed by the applicant to be of possible relevance to the present disclosure. No admission is intended, nor should such admission be inferred or construed, that any of the preceding information constitutes prior art against the present disclosure. Other aims, objects, advantages and features of the disclosure will become more apparent upon reading of the following non-restrictive description of specific embodiments thereof, given by way of example only with reference to the accompanying drawings.

The present disclosure provides a part hold-down assembly for retaining an oversized part. In illustrative embodiments, the part hold-down assembly is aligned along a central force axis and applies a downward force onto the part. The part-hold down assembly may include a top plate, a bottom plate, and a compression assembly extending between the top and bottom plates. The compression assembly illustratively includes two, parallel-biasing assemblies that extend along compression axes that are parallel to but offset from the central force axis. Each biasing assembly may include an upper collar, a lower collar and a resilient biasing member retained between the upper and lower collar. The parallel biasing assemblies are positioned on opposite sides from each other about the central force axis, and may be spaced away from the central force axis an equal distance. Such an assembly provides means for retained an oversized part for processing operations.

These and other advantages and features will become more apparent from the following description taken in conjunction with the drawings.

BRIEF DESCRIPTION OF THE DRAWINGS

The present disclosure will be described hereafter with reference to the attached drawings, which are given as a non-limiting example only, in which.

Figure 1:
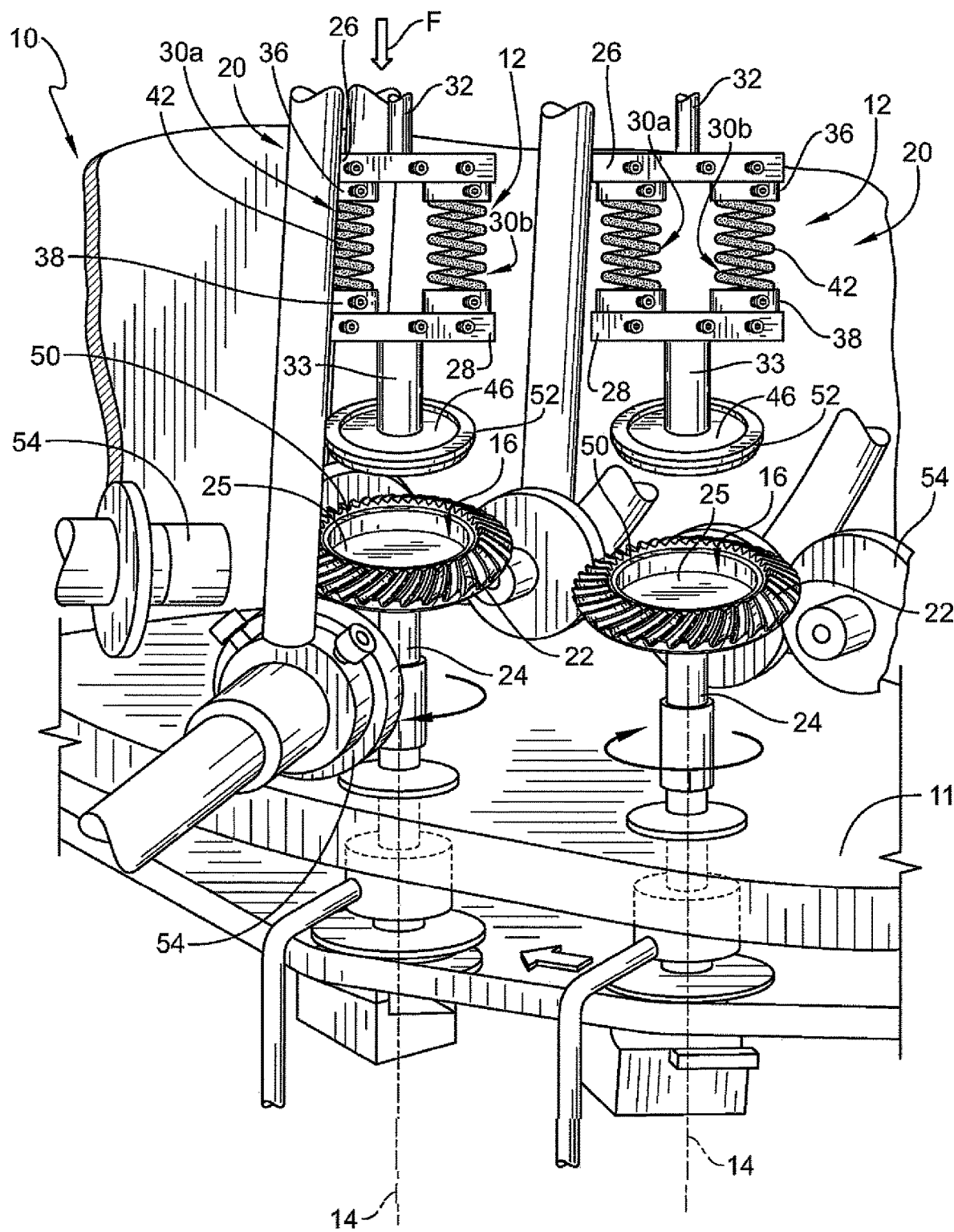
FIG. 1 is a perspective view of an automatic part processing apparatus for processing a part by a method such as peening, with a portion of the apparatus broken away to reveal a turntable and a set of lower spindles, and having a part hold-down assembly constructed according to the teachings of the present disclosure.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

As shown in FIG. 1, a processing assembly 10 of a larger parts-processing apparatus is shown. The overall parts processing apparatus is similar to that as shown and described in U.S. Pat. No. 5,272,897, incorporated by reference herein. While the basic operation of this parts processing apparatus will be described herein below, the primary focus of the present application will be on the structures and functions associated with a part hold-down assembly or apparatus 20.

The part processing apparatus shown and described in U.S. Pat. No. 5,272,897 is configured to process standard-sized parts or components that may be typical of the size, shape, dimension and weight of an average part. However, such a part processing apparatus may not be suitable for use with oversized or unusually larger parts, as such, an apparatus may not be capable of retaining such larger parts successfully or effectively. In particular, if a part, such as an automotive gear, has a large diameter or substantial weight, the part hold-down assembly may be unable to maintain the oversized part in a fixed, suitable position while the part is rotated about the hold-down assembly. Such inability to maintain the oversized part in a stable position during rotation may be the result of a variety of factors, including for example size or force constraints of components of a standard hold-down assembly. Accordingly, the part may shift or move in an unintended manner within the processing apparatus, causing the surfaces of the part to be over or under exposed to the peening media during the peening process.

The present disclosure is directed to an improvement that provides for effective retainment of an oversized part within a part processing apparatus. During the use of the processing apparatus 10, an oversized part 22 can be fixtured on a rotatable support 24, as illustrated in FIG. 1. An example of such a part 22 might include an automotive gear component that includes a cylindrical cavity 16. A plate or pin 25 extends from the support 24 through the cavity 16 of the part 22 to help provide axial alignment of the part 22 within the processing assembly 10. As noted, the part 22 is an oversized part that may be larger in size or weight than standard-sized parts that may be processed as shown and described in U.S. Pat. No. 5,272,897.

As illustrated in FIG. 1, the part hold-down assembly 20 generally includes a top spring plate 26, a bottom spring plate 28, and a spring or compression assembly 12. The compression assembly 12 is configured to be secured between the top spring plate 26 and the bottom spring plate 28 to be retained therebetween. The top spring plate 26 and bottom spring plate 28 may be configured as a bar or block that includes one or more apertures extending there through to assist with securement of the plates 26 and 28 to the compression assembly 12, as discussed more fully below. In illustrative embodiments, the top spring plate 26 includes a top surface 21 and a bottom surface 23 spaced apart from the top surface 21. Similarly, the bottom spring plate 28 includes a top surface 27 and a bottom surface 29 spaced apart from the top surface 27.

Figure 3:
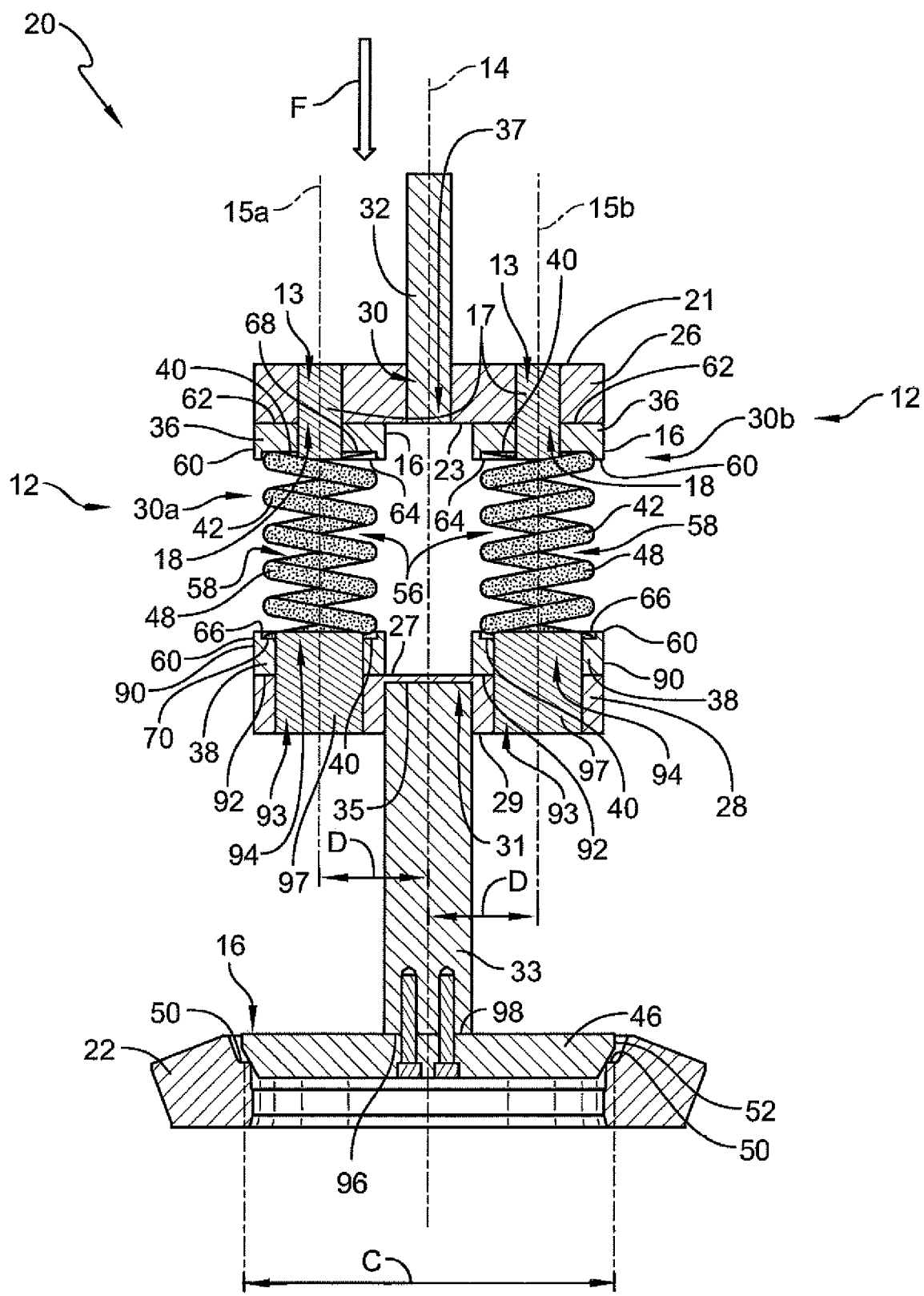
FIG. 3 is a cross-sectional view of the part hold-down assembly of FIG. 2, and showing the part hold-down assembly engaging with an oversized part.

The part hold-down assembly 20 is configured along a force or central axis 14, with the part 22 being processed being retained in a position generally aligned with the central axis 14 by application of downward force from the part hold-down assembly 20 along the central axis 14. Accordingly, the support 24 upon which the part 22 is retained may also be axially aligned with the central axis 14 within the processing assembly 10. The force axis 14 indicates the location of force applied from the part hold-down assembly 20 upon the part 22, as illustrated in FIG. 3 and discussed further below. In illustrative embodiments, the top spring plate 26 and bottom spring plate 28 extend substantially perpendicular to the central axis 14, and the central axis 14 is positioned substantially at the longitudinal middle of the top and bottom spring plates 26 and 28.

Figure 2:
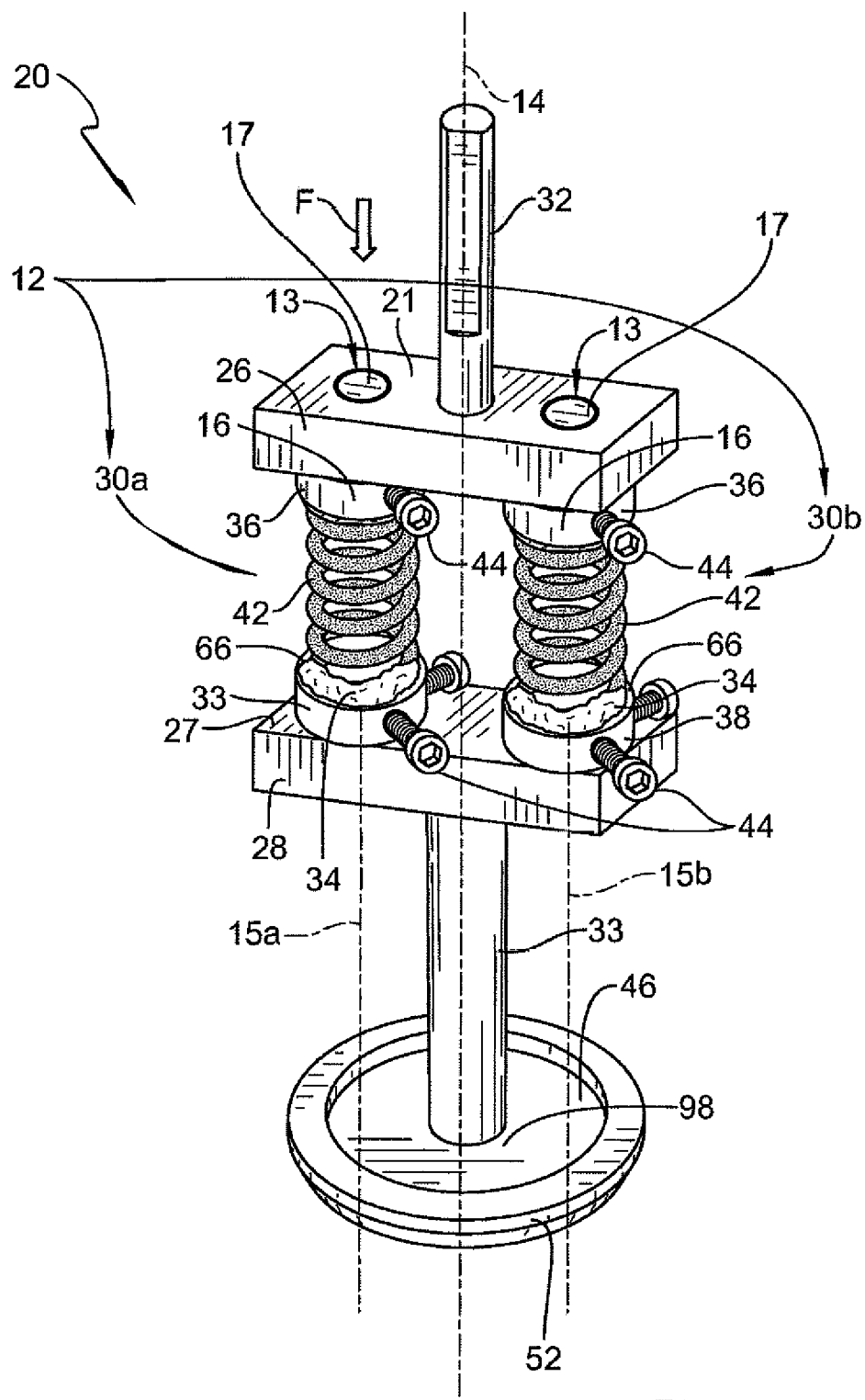
FIG. 2 is a front side perspective view of the part hold-down assembly of the present invention including two resilient biasing members in parallel with each other and positioned on generally opposing sides of a force axis of the part hold-down assembly, the part-hold down assembly further including a pair of corresponding collars for each resilient biasing member.

The compression assembly 12 includes a pair of resilient biasing assemblies, 30a and 30b. As illustrated in FIGS. 1-4 and 6, the resilient biasing assemblies 30a and 30b are identical in design and are positioned generally on opposing sides of the central axis 14 of the part hold-down assembly 20. The resilient biasing assemblies 30a and 30b are positioned along compression axes 15a and 15b that are parallel to, but offset from, the central axis 14 of the part hold-down assembly 20. In particular, the compression axes 15a and 15b may be spaced apart from the central axis 14 by a distance D, where the distance D may be between 1 and 3 inches. In a preferred embodiment, the distance D is 1.875 inches. Accordingly, the resilient biasing assemblies 30a and 30b are positioned on opposing sides of the central axis 14 (or 180 degrees away from each other about the central axis 14), as illustrated in FIGS. 2-3. As the resilient biasing assemblies 30a and 30b are substantially identical in design, the present disclosure will discuss them jointly with the understanding that the disclosure provided is attributable independently to each assembly 30a and 30b.

Each of the resilient biasing assemblies 30a and 30b of the compression assembly 12 include an upper collar 36, a lower collar 38, and a compression or resilient biasing member 42. The upper collar 36, lower collar 38, and resilient biasing member 42 are generally aligned to extend laterally with respect to each other along the compression axis 15a and 15b of each resilient biasing assembly 30a and 30b. The resilient biasing member 42 is retained between the upper and lower collars 36, 38 and configured to be moveable between a first, natural state and a second, compressed stated when a force F is applied to the upper or lower collars 36 and 38 in a direction that is generally parallel to the compression axes 15a/15b. As noted, the compression axis 15a/15b of each of the resilient biasing assemblies 30a and 30b are positioned to be generally parallel to, but offset from, the force axis 14 of the hold-down assembly 20. The upper collar 36 and the lower collar 38 may be made of any suitable material, including metals and plastics, to perform necessary function of such operation. Specific features of the upper and lower collars 36 and 38 are described in more detail later this disclosure.

The resilient biasing member 42 is shown by way of illustration and not for limitation as a coil spring 42 or other compressive structure. In various embodiments, the coil spring 42 includes a first end 68 and a second end 70, and is formed to include a central passage 58 from the first end 68 to the second end 70. The coil spring 42 is formed from one or more coils 48 wrapped in a circular manner, with each wind of the coil 48 configured to be spaced apart from an adjacent wind in its nature state so as to form one or more spaces 56 between each wind.

When the coil spring 42 is compressed, the coils 48 are moved together to reduce the overall distance between the first and second ends 68 and 70 of the coil spring 42. Other forms of a resilient biasing member 42 may be used to achieve the claimed invention and every other form of such member is incorporated within the scope of this disclosure to provide the structures and functions of the invention. The resilient biasing member 42 may be made of any suitable material, including metals and plastics.

The upper collar 36 includes a circumferential side 16 that extends between a plate-engaging end 62 and a coil-engaging end 64 of the upper collar 36. The upper collar 36, for example the coil-engaging end 64 of the upper collar 36, is configured to engage with the resilient biasing member 42 to apply a compression force from the top spring plate 26 onto the resilient biasing member 42, which will thereafter transfer a compression force onto the lower collar 38. The lower collar 38 includes a circumferential side 90 that extends between a plate-engaging end 92 and a coil-engaging end 66 of the lower collar 38. The lower collar 38, for example the coil-engaging end 66 of the lower collar 38, is configured to secure the second end 70 of the coil spring 42 and to permit transfer of a compressive force from the upper collar 36 to the bottom spring plate 28.

Figure 4:
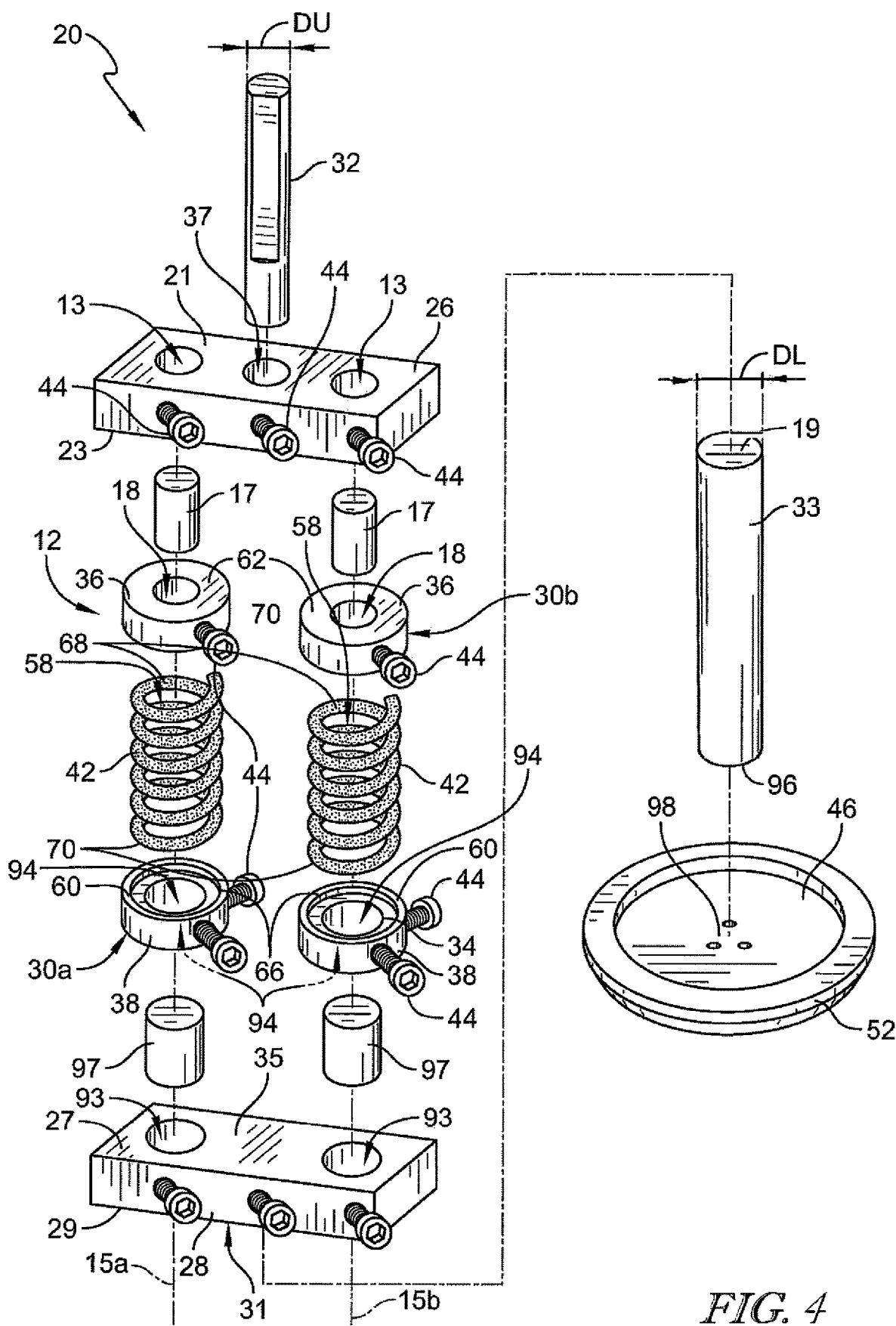
FIG. 4 is an exploded, side perspective view of the part hold-down assembly of FIG. 2.
Figure 5:
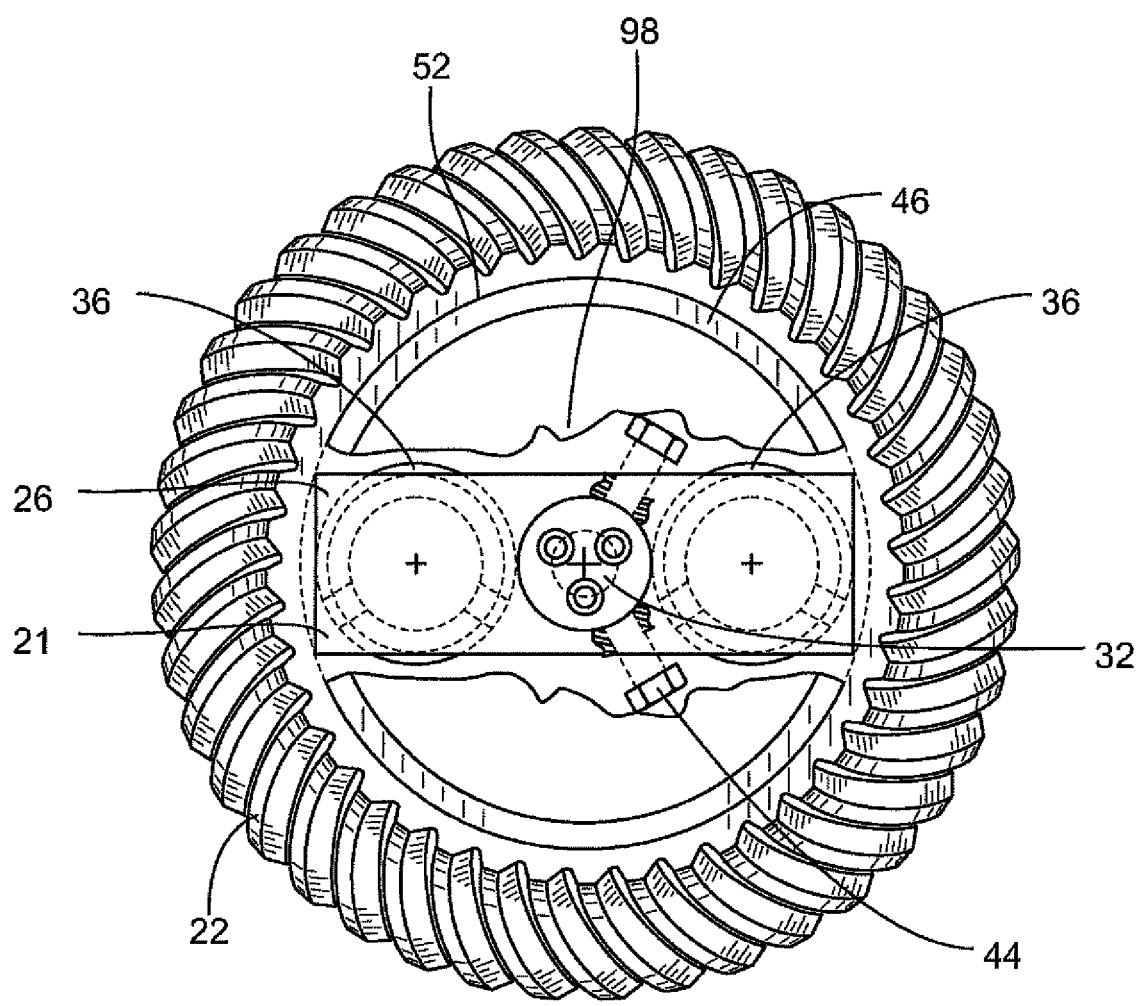
FIG. 5 is top perspective view of the part hold-down assembly of FIG. 2 illustrating portions of the assembly cut away to expose components of part hold-down assembly.
Figure 6:
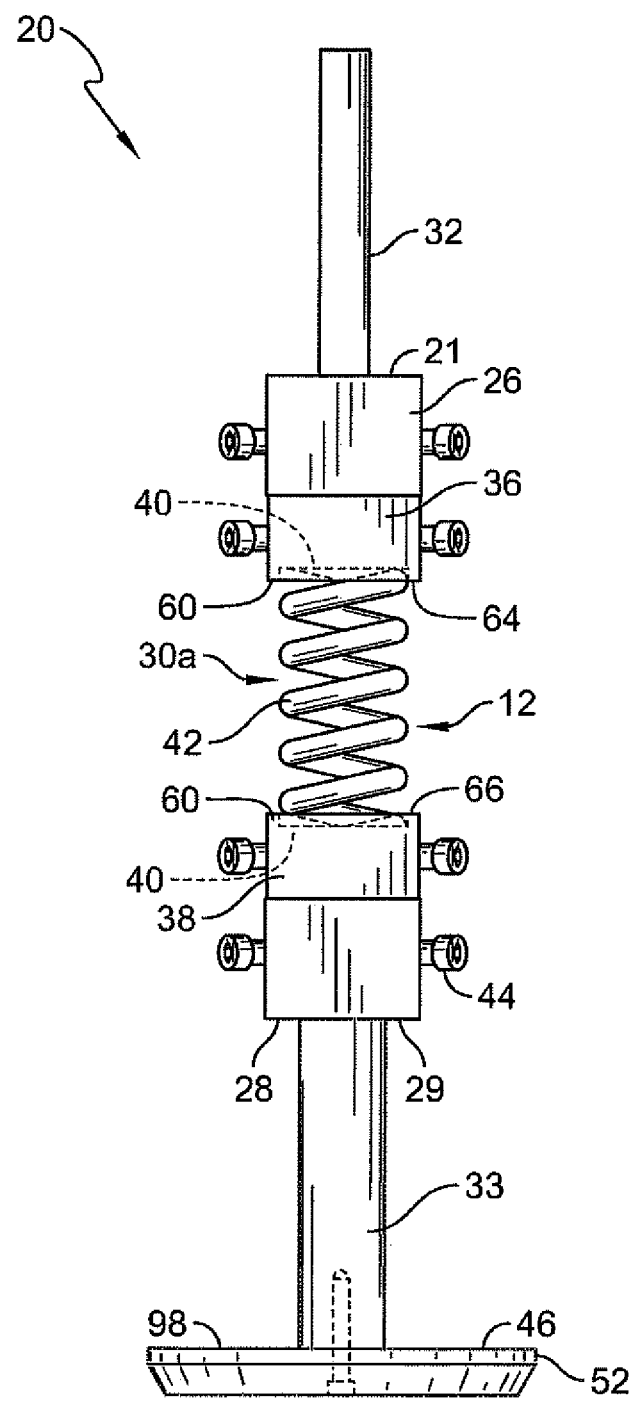
FIG. 6 is a right side view of the part hold-down assembly of FIG. 2.

The hold-down assembly 20 is carried on an upper portion of the processing assembly 10 with an upper shaft 32 providing a point of contact with the processing assembly 10. In illustrative embodiments, the upper shaft 32 is coupled to the top spring plate 26, as illustrated in FIG. 4. In various embodiments, the upper shaft 32 is connected to the top surface 21 of the top spring plate 26 and extends through a portion of a coupling aperture 37 to secure the upper shaft 32 to the top spring plate 26, as illustrated in FIGS. 2-4. In alternative embodiments, the upper shaft 32 could extend entirely through the coupling aperture 37 to the bottom surface 23, or may extend past the bottom surface 23 below the top spring plate 26. Illustratively, the coupling aperture 37 extends from the top surface 21 of the top spring plate 26 to the bottom surface 23 of the top spring plate 26, although other embodiments, such as only a partial extension therethrough, are envisioned herein. One or more set screws 44 can be provided through or within the top spring plate 26 for facilitating or improving securement of the top spring plate 26 to the upper shaft 32 as it extends within the coupling aperture 37, as illustrated in FIG. 4. In various embodiments, the diameter DU of the upper shaft 32 is configured so that the perimeter surface of the upper shaft 32 frictionally engages with a circumferential surface of the top spring plate 26 that defines the coupling aperture 37.

The hold-down assembly 20 further includes a lower shaft 33 that provides means for transferring the force applied by the hold-down assembly 20 to the part 22 being processed. In illustrative embodiments, the bottom spring plate 28 is coupled to the lower shaft 33, as illustrated in FIG. 4. In various embodiments, the lower shaft 33 is coupled to the bottom surface 29 of the bottom spring plate 28 and extends through a portion of a coupling aperture 31 in order to secure the lower shaft 33 to the lower collar 38, as illustrated in FIGS. 1-3. In alternative embodiments, the lower shaft 33 could extend entirely through the coupling aperture 31. Illustratively, and as shown in FIGS. 3-4, the coupling aperture 31 extends from the bottom surface 29 of the bottom spring plate 28 to an abutment surface 35 of the bottom spring plate 28 that defines the limits of the coupling aperture 31 and acts as a block or stop for a top surface 19 of the lower shaft 33 to abut against. Accordingly, the coupling aperture 31 illustratively does not extend to the top surface 27 of the bottom spring plate 28, although other embodiments, such as a full extension through the bottom spring plate 28, are envisioned herein. One or more set screws 44 can be provided within the bottom spring plate 28 for facilitating or improving securement of the bottom spring plate 28 to the lower shaft 33 as it extends through the coupling aperture 31, as illustrated in FIGS. 3-4. In various embodiments, the diameter DL of the lower shaft 33 is configured so that the perimeter surface of the lower shaft 33 frictionally engages with a circumferential surface of the bottom spring plate 28 that defines the coupling aperture 31.

The lower shaft 33 may optionally include an end or masking plate 46 that provides a point of contact with the part being processed. In particular, the masking plate 46 may be sized and configured to be retained within the cavity 16 of the oversized part 22 being processed. As can be understood, the cavity 16 of the oversized part 22 may be oversized or larger than a cavity of a typical part being processed, and therefore the masking plate 46 may similarly be have a larger diameter than in a traditional processing apparatus.

The masking plate 46 includes at least a top surface 98 and radial edge surface 52. The top surface 98 is configured to be coupled to the lower shaft 33. Specifically, the end or masking plate 46 can extend from a bottom end 96 of the lower shaft 33 and can be welded or otherwise fixedly attached at the top surface 98 to move with lower shaft 33. In various embodiments, the masking plate 46 may have a circumference C that is the less than, the same or greater than a circumference of the cylindrical cavity 16 of the part 22 being processed. In various embodiments, the masking plate 46 is configured as part of the lower shaft 33, but may be separate components as well.

In various embodiments, the radial edge surface 52 of the masking plate 46 mirrors or is configured to mate with a corresponding inner surface of the part 22 being processed that at least partially defines the cylindrical cavity 16. In various embodiments, the masking plate 46 is used to abut against a corresponding radial inner surface 50 of the part 22 in order to block or mask processing of that surface 50 of the part 22. Specifically, masking occurs by engaging the radial edge surface 52 of the masking plate 46 with the corresponding surface 50 of the part 22. With at least a portion of the surfaces 50, 52 in face-to-face contact, portions of the surface 50 of the part 22 are shielded or blocked from the processing steps. For example, one type of process used with such processing assembly 10 may be peening. As shown in FIG. 1, a series of peening nozzles 54 may be directed in the general vicinity and direction of parts 22 carried on the processing assembly 10. Since portions of the surface 50 of part 22 are blocked from receiving the peening material by the radial edge surface 52, the peening material exiting the nozzles 54 cannot act on such portions of the surface 50 during a peening process.

As noted, each biasing assembly 30a and 30b also includes specifically designed upper collars 36 and lower collars 38. Also as noted, the upper collars 36 include the plate-engaging end 62 and the coil-engaging end 64, and the lower collars 38 include the plate-engaging end 92 and the coil-engaging end 66.

In an illustrative embodiment, the upper collars 36 and lower collars 38 each further include a contact surface 40 that is adjacent to but offset from the coil-engaging ends 64 and 66. The contact surface 40 is configured to provide a contact or abutment location for the resilient biasing members 42 when assembled together in the resilient biasing assemblies 30a and 30b. As shown more explicitly in FIGS. 2-4, a corresponding annular ledge 60 may be formed in corresponding coil-engaging ends 64, 66 of each collar 36, 38. The contact surfaces 40 of each collar 36, 38 are radially inward of the annular ledge 60. In illustrative embodiments, the ledge 60 extends from the ends 64, 66 to the contact surface 40 of each collar 36, 38. Other embodiments are also envisioned. The annular ledge 60 provides a fixturing and locating structure for a positive engagement between coil ends 68, 70 of the resilient biasing member 42 (described herein) and the collars 36, 38 for each resilient biasing assembly 30a and 30b. The coil ends 68, 70 of the resilient biasing member 42 can be retained in the annular ledge 60 the collars 36, 38.

As noted above, the attachment of the resilient biasing member 42 relative to the collars 36, 38 is intended to be broadly interpreted. The coil ends 68, 70 of the resilient biasing member 42 can be welded to the contact surfaces 40 within the corresponding ledge 60 providing weld sillets between the contact surface 40 and the coil ends 68, 70. Alternatively, the coil ends 68, 70 of the resilient biasing member 42 may be welded with weld material 34 to the corresponding ends 64, 66, respectively, of the collars 36, 38, as illustrated in FIG. 2. As another alternative, other means such as strapping, interference fit, or other ways of attaching the resilient biasing member 42 to the collars 36, 38 are included within the scope of the present disclosure. In an exemplary embodiment, the annular ledge 60 can be formed with an inside diameter which is approximately equal to and, perhaps, slightly smaller than the corresponding outside diameter, respectively, of the coil ends 68, 70 of the resilient biasing member 42. In this regard, a tight interference or friction fit can be formed between the ledge 60 and the coil ends 68, 70, either eliminating the need for welding, or complementing a weld 34 connection in addition to the interference fit. Additionally, a strap, sheath, or other mechanical attachment (not shown) can be connected between the collars 36, 38 to retain the resilient biasing member 42 there between in a slightly compressed manner so that the resilient biasing member 42 is retained with the collars 36, 38 as an assembly. Typically, an apparatus such as shown in FIG. 1 may not include a variety of means or structures for holding the parts hold-down assembly 20 together, but may incorporate one primary type of retaining within the parts hold-down assembly 20.

With reference to FIGS. 1-4, the upper collar 36 and the lower collar 38 and the resilient biasing member 42 are assembled together, with the upper collar 36 configured for attachment to the top spring plate 26 and the lower collar 38 configured for attachment to the bottom spring plate 28. The collars 36 and 38 permit suspension of the resilient biasing member 42 therebetween and permit application of force upon the resilient biasing member 42 from the top spring plate 26.

The resilient biasing member 42 may be made by various methods to achieve desired strength and resilient biasing member force within the hold-down assembly 20. The resilient biasing member 42 may, for instance, be subjected to a processing step as well, such as peening, to provide improved strength or stability characteristics. As illustrated in FIG. 3, the resilient biasing member 42 includes coil ends 68, 70 that are configured to maximize engagement with the contact surfaces 40 of upper and lower collars 36, 38. In illustrative embodiments, ends 68, 70 may be flattened to maximize engagement with the upper and lower collars 36, 38. The coil ends 68 and 70 may be flattened, for instance, by machining. While flattened coil ends 68, 70 are envisioned, the coil ends 68, 70 may not be machined or formed as flattened ends, but may be formed as non-flattened ends. Either way, the coil ends 68, 70 of the resilient biasing member 42 are configured to be retained against the collars 36, 38. The resilient biasing member 42 may be specifically sized to engage with and be retained by upper and lower collars 36, 38.

As noted, the part hold-down assembly 20 is specifically designed for processing of oversized parts 22 that may not be suitably processed in a standard part-processing apparatus. While not described herein, reference is made to the incorporated patent, U.S. Pat. No. 5,272,897 with regard to the operation of a standard part-processing apparatus. As described therein, the processing assembly 10 of the present disclosure also receives an oversized part 22 mounted on the support 24, which is then processed in an automated manner. The proposed part hold-down assembly 20 of the present disclosure permits automated fixturing of the part hold-down assembly 20 against an oversized part 22, rotation of the part 22 relative to the nozzles 54 and movement of the part 22 on a turntable 11 through a processing path. While the process itself is not the subject of the present application, the operation of the process is important because it highlights the need for the structures and functions of the part hold-down assembly 20 as disclosed herein for oversized parts 22.

The biasing assemblies 30a and 30b may be coupled to the top spring plate 26 and the bottom spring plate 28 by varying means. In an illustrative embodiment, the upper collar 36 of each of the biasing assemblies 30a and 30b is formed to include a central aperture 18. The central aperture 18 may be generally formed along the compression axes 15a/15b of the biasing assemblies 30a and 30b, as illustrated in FIGS. 3-4. The top spring plate 26 may similarly be formed to include an alignment aperture 13 that aligns with the central aperture 18 of the upper collar 36 along the compression axes 15a/15b. As illustrated in FIGS. 3-4, the top spring plate 26 may include two alignment apertures 13 that align with compression axes 15a and 15b, respectively. A connection rod 17 is configured to extend within the apertures 18 and 13 to couple the top spring plate 26 to the upper collar 36. One or more set screws 44 can be provided through or within the top spring plate 26 for facilitating or improving securement of the connection rod 17 to the top spring plate 26 as it extends within the alignment aperture 13, as illustrated in FIG. 4. Similarly, one or more set screws 44 can be provided through or within the upper collar 36 for facilitating or improving securement of the connection rod 17 to the upper collar 36 as it extends within the central aperture 18, as illustrated in FIG. 4. In various embodiments, the diameter of the connection rod 17 is configured so that the perimeter surface of the connection rod 17 frictionally engages with a circumferential surface of the central aperture 18 and alignment aperture 13 of the upper collar 36 and the top spring plate 26, respectively. Illustratively, the connection rod 17 extends along the compression axes 15a/15b but does not extend into the central passage 58 of the resilient biasing member 42.

In an illustrative embodiment, the lower collar 38 of each of the biasing assemblies 30a and 30b is formed to include a central aperture 94. The central aperture 94 may be generally formed along the compression axes 15a/15b of the biasing assemblies 30a and 30b, as illustrated in FIGS. 3-4. The bottom spring plate 28 may similarly be formed to include an alignment aperture 13 that aligns with the central aperture 18 of the upper collar 36 along the compression axes 15a/15b. As illustrated in FIGS. 3-4, the bottom spring plate 28 may include two alignment apertures 93 that align with compression axes 15a and 15b, respectively. A connection rod 97 is configured to extend within the apertures 94 and 93 to couple the bottom spring plate 28 to the lower collar 38. One or more set screws 44 can be provided through or within the bottom spring plate 28 for facilitating or improving securement of the connection rod 97 to the bottom spring plate 28 as it extends within the alignment aperture 93, as illustrated in FIG. 4. Similarly, one or more set screws 44 can be provided through or within the lower collar 38 for facilitating or improving securement of the connection rod 97 to the bottom collar 38 as it extends within the central aperture 94, as illustrated in FIG. 4. In various embodiments, the diameter of the connection rod 97 is configured so that the perimeter surface of the connection rod 97 frictionally engages with a circumferential surface of the central aperture 94 and alignment aperture 93 of the lower collar 38 and the bottom spring plate 28, respectively. Illustratively, the connection rod 97 extends along the compression axes 15a/15b but does not extend into the central passage 58 of the resilient biasing member 42.

As discussed above, the proposed part hold down assembly 20 is configured to transfer a compression force F from the upper shaft 32 to the oversized part 22 being retained on the rotatable support 24 to maintain the oversized part 22 in a fixed location during the processing operation. The compression assembly 12 utilizes parallel biasing assemblies 30a and 30b to provide compressive forces upon the bottom spring plate 28 that are spaced apart from the central axis 14 along which the oversized part 22 is held. In particular, locating the biasing assemblies 30a and 30b on opposite sides of the central axis 14 provides, for example, addition structural support for the hold down assembly 20 as it applies a downward force upon an oversized part 22 via the larger-diametered masking plate 46. Further, the parallel biasing assemblies 30a and 30b permit use of standard-sized biasing members 42 (thereby avoiding the need for specialty sizes or shapes of biasing members) when processing oversized parts 22 that may be unable to be adequately maintained in a standard hold down mechanisms. Additional advantages of the proposed parallel biasing assemblies 30a and 30b include reduction in breakage of standard-sized biasing members or extension of life of the biasing members 42 utilized; utilization of higher downward force F upon the part 22 being processed to retain the part without concern of component failure; a more stable process as the components move up and down multiple times per hour; and a system that can withstand more wear and tear from the processing (e.g. shot peening) material that will be blasted against the hold down assembly 20 during operation. The biasing assemblies 30a and 30b are positioned to be in parallel alignment at approximately the same distance away from the central axis 14 in order to promote even distribution of force upon the compression assembly 12 during operation, thereby reducing the potential for early fracture or failure or the components of the compression assembly 12.

In operation, the part hold down assembly 20 is moved downward toward an oversized part 22 retained on the rotatable support 24 until the masking plate 46 abuts against the part 22. The part hold down assembly 20 applies downward force F through the upper shaft 32 to the top spring plate 26, which transfers the force F through the parallel biasing assemblies 30 and 30b of the compression assembly 12 along the compression axes 15a/15b. The downward force of the top spring plate 26 causes the resilient biasing members 42 of the biasing assemblies 30a and 30b to be compressed, as noted above, causing additional downward force F to be applied to the bottom spring plate 28. The bottom spring plate 28 transfers the downward force F from the biasing assemblies 30a and 30b (along the compression axes 15a and 15b) to the lower shaft 33 (along the central axis 14), which in turn transfers the force to the masking plate 46 to hold the part 22 in a substantially fixed position upon the rotatable support 24 during the processing operation. A more uniform or even distribution of force upon the oversized part 22 is achieved.

By way of review, an oversized part 22 is attached or fixtured on the support 24 of the processing assembly 10, as disclosed herein. The part 22 is then captured between the support 24 and the masking plate 46 of the parts hold-down assembly 20. The part hold-down assembly 20 includes a compression assembly 12 between top and bottom spring plates 26 and 28, the compression assembly 12 including parallel biasing assemblies 30a and 30b that each include collars 36, 38 retaining the resilient biasing member 42 there between. The resilient biasing member 42 provides a degree of compressive engagement to retain the part 22 on the support 24 and may be in the form of a coil spring 42. The part hold-down assembly 20 carried on the upper shaft 32 is raised and lowered during the automated processing steps making axial alignment of the part hold-down assembly 20 relative to the part 22 carried on the support 24 an important processing step. As the part hold-down assembly 20 is axially advanced downwardly toward the part 22, a corresponding surface 52 of the masking plate 46 may engage a corresponding surface 50 of the part 22 during the processing. The processing may include, but is not limited to, peening operations. For example, the part 22 can be rotated on the lower support 24 during the processing step, during which a group of peening nozzles 54 spray peening material at the part 22 to provide processing characteristics on the part 22 surfaces to, in part, improve wear and durability as well as other characteristics. The parallel alignment of the biasing assemblies 30a and 30b within the compression assembly 12 provide permit use of standard-sized components of the biasing assemblies 30a and 30b while providing improved stability and control over the hold-down of an oversized part 22 being processed.

The foregoing terms as well as other terms should be broadly interpreted throughout this application to include all known as well as all hereafter discovered versions, equivalents, variations and other forms of the abovementioned terms as well as other terms. The present disclosure is intended to be broadly interpreted and not limited.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation so as to encompass all such modifications and equivalent structures and functions.

The invention claimed is:

1. A part hold-down assembly, comprising:
   a top plate extending substantially perpendicular to a central force axis;
   a bottom plate extending substantially perpendicular to the central force axis; and
   a compression assembly retained between the top plate and bottom plate, the compression assembly comprising:

a first upper collar, a first lower collar, and a spring retained between the first upper collar and the first lower collar; and a second upper collar, a second lower collar, and a second spring-retained between the second upper collar and the second lower collar;

wherein the first spring is positioned along a first axis that is parallel to but offset from the central force axis, the second spring is positioned along a second axis that is parallel to but offset from the central force axis, and the first axis and the second axis are separated from each other along the central force axis.

2. The part hold-down assembly of claim 1, wherein the first and second upper collars and the first and second lower collars all include an annular ledge configured to engage with ends of the first and second springs to retain the first and second springs along the first and second axes.

3. The part hold-down assembly of claim 2, wherein the first and second springs include flattened ends retained by the annular ledges of the first and second upper collars and the first and second lower collars.

4. The part hold-down assembly of claim 3, wherein the flattened ends of the springs are retained within the annular ledges of the first and second upper collars and the first and second lower collars by frictional fit.

5. The part hold-down assembly of claim 1, wherein the central force axis extends through the top plate at generally a longitudinal midpoint of the top plate, and wherein the central force axis extends through the bottom plate at generally a longitudinal midpoint of the bottom plate.

6. The part hold-down assembly of claim 5, wherein the part hold-down assembly further includes an upper shaft configured to transfer force onto the top plate, wherein the top plate includes a coupling aperture configured to receive the upper shaft, and wherein the coupling aperture is positioned along the central force axis.

7. The part hold-down assembly of claim 6, wherein the coupling aperture extends from a top surface of the top plate to a bottom surface of the top plate.

8. The part hold-down assembly of claim 5, wherein the part hold-down assembly further includes a lower shaft configured to extend toward a part being processed, wherein the bottom plate includes a second coupling aperture configured to receive the lower shaft, and wherein the second coupling aperture is positioned along the central force axis.

9. The part hold-down assembly of claim 1, wherein the part hold-down assembly further includes a masking plate connected to the bottom plate, the masking plate configured to abut against the part being retained during processing.

10. The part hold-down assembly of claim 9, wherein the masking plate includes an outer circumferential surface that corresponds to an inner circumferential surface that forms a central cavity of the part being retained.

11. The part hold-down assembly of claim 10, wherein the outer circumferential surface of the masking plate abuts against the inner circumferential surface of the part being processed in order to block processing of at least a portion of the inner circumferential surface.

12. The part hold-down assembly of claim 1, wherein the first axis is spaced apart from the central force axis a first distance, the second axis is spaced apart from the central force axis a second distance, and the first and second distances are equal to each other.

13. The part hold-down assembly of claim 12, wherein the first and second distances are approximately 1.875 inches.

14. The part hold-down assembly of claim 1, wherein the top plate is coupled to the first spring by a first connection rod that extends along the first axis, and the bottom plate is coupled to the first spring by a second connection rod that extends along the first axis.

15. The part hold-down assembly of claim 14, wherein the spring includes a central passage, and wherein the first and second connection rods do not extend into the central passage.

16. The part hold-down assembly of claim 1, wherein the bottom plate transfers force from the first axis and the second axis to the central force axis in order to apply a hold-down force to the part during processing.

17. The part hold-down assembly of claim 16, wherein the bottom plate is coupled to a lower shaft that is positioned along the central force axis, the lower shaft engaging the part being processed.

18. The part hold-down assembly claim 17, wherein the lower shaft includes a masking plate that abuts against a surface of the part being processed.

19. The part hold-down assembly of claim 1, wherein the part being processed is an automotive gear with a circumferential outer surface.

20. A method of retaining a part being processed, the method comprising:

positioning the part upon a rotatable support, the rotatable support extending along a central force axis;

aligning a part hold-down assembly above the part along the central force axis, the part hold-down assembly including:

a top plate extending substantially perpendicular to the central force axis;

a bottom plate extending substantially perpendicular to the central force axis; and a first spring and a second spring, wherein the first spring is positioned along a first compression axis that is parallel to but offset from the central force axis, the second spring is positioned along a second compression axis that is parallel to but offset from the central force axis, and the first compression axis and the second compression axis are positioned generally opposite from each other along the central force axis; and moving the part hold-down assembly such that a compression force is applied to the part, the compression force first traveling from the central force axis to the first and second compression axes through the top plate, and the compression force then traveling from the first and second compression axes back to the central force axis through the bottom plate.

* * * * *